United States Patent Office 2,996,520
Patented Aug. 15, 1961

2,996,520
COMPOUNDS OF THE TYPE ACETIC(TRI-
MELLITIC ANHYDRIDE) ANHYDRIDE
James O. Knobloch, Hobart, Ind., and Hsiang P. Liao, Park Forest, Ill., assignors to Standard Oil Company, Chicago, Ill., a corporation of Indiana
No Drawing. Filed Oct. 21, 1959, Ser. No. 847,685
2 Claims. (Cl. 260—346.3)

This is a continuation-in-part of our copending application Serial No. 751,844, filed July 30, 1958, now Patent No. 2,911,416.

This invention relates to organic compounds containing two anhydride groups with one group acting as a bridge between two dissimilar "carboxylic acids." More particularly the invention relates to acetic(trimellitic anhydride) anhydride.

A novel class of compounds has been discovered, which class has the following structural configuration,

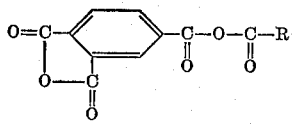

wherein R is selected from the class consisting of aliphatic, aromatic and heterocyclic groups.

These new compounds may be visualized as derivatives of trimellitic anhydride and a monocarboxylic acid with an anhydride group bridging the two "carboxylic acids." The monocarboxylic acids may be aliphatic monocarboxylic acids, aromatic monocarboxylic acids, and heterocyclic monocarboxylic acids. Particularly suitable are the anhydrides of these acids. Illustrative of suitable acids and anhydrides are, acetic acid, acetic anhydride, propionic anhydride, butyric acid, acrylic acid, crotonic acid, valeric acid, enanthic acid, caprylic acid, capric acid, undecanoic acid, lauric acid, palmitic acid, stearic acid, docosanoic acid, oleic acid, erucic acid, bromoacetic acid, chloropropionic acid, mercaptoacetic acid, cyclopropanecarboxylic acid, cyclohexanecarboxylic acid, benzoic acid, naphthoic acid, toluic acid, chlorobenzoic acid, phenylacetic acid, phenylpropionic acid, naphthylacetic acid, nicotinic acid, indoleacetic acid, and cinchoninic acid. The lower and intermediate alkanoic acids and their anhydrides, i.e., $C_2$-$C_{11}$, are particularly suitable.

It is apparent that "R" in the above structural configuration may be defined as the aliphatic, aromatic and heterocyclic nucleus of the corresponding monocarboxylic acid. Thus in the case of the particularly suitable alkanoic acids, R is alkyl containing from 1 to 10 carbon atoms.

The compounds of the invention can be characterized by the formation of bis(trimellitic anhydride) anhydride on heating, slowly, to a temperature in the region of 120-150° C. Bis(trimellitic anhydride) anhydride has an acid number of 920, melts in the region 220-225° C., and has the following structural configuration

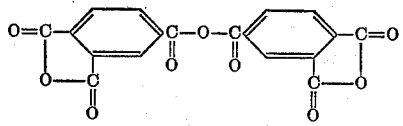

*Example I*

One method of preparing the compounds of the invention is illustrated by the making of acetic(trimellitic anhydride) anhydride.

16.5 g. of trimellitic anhydride was dissolved in 100 ml. of hot acetic anhydride and maintained at reflux temperature for four hours. The flask was permitted to stand overnight and then about 80 ml. of acetic anhydride distilled away. The remaining material in the flask was cooled to ice temperature, the material solidified and stayed solid at room temperature. The last of the acetic anhydride was removed by heating the solid to about 80° C. under vacuum; a thick syrup appeared and formed a glass on cooling. The glass was maintained under vacuum evaporation until the glass had changed into a white solid containing a minor amount of yellow syrup.

A small amount of this white solid was washed with heptane and dried under vacuum. The acid number (mg. of KOH per g. of solid) was 960; the calculated acid number of acetic(trimellitic anhydride) anhydride is 959.

The white solid and syrup was heated with 70 ml. of heptane; the solid became molten below 100° C. but did not dissolve. The heptane mixture was cooled with stirring and filtered. The recovered solid was dried overnight at 50° C. in a vacuum oven; the dried solid weighed 15.7 g. This solid had an acid number of 956 and melted over the range of 74-79° C.

When placed on a block and slowly heated a solid having a melting point of about 210° C. was obtained; indicative of bis(trimellitic anhydride) anhydride formation.

*Example II*

Trimellitic anhydride (186 grams) and 300 grams acetic anhydride were boiled in an Erlenmeyer until the B.P. of acetic anhydride was reached (180° C. pot temperature). The cooled mixture became a solid mass. Dissolved in twice its volume of boiling toluene, the solution was filtered to remove a slight flocculent precipitate. The toluene filtrate was poured into one liter heptane to give an oil that slowly crystallized—the major product. Crystals were washed with hexane and stored in vacuum desiccator. Solid melted 68-85° C. A month later this material was dried in 80-100° C. vacuum oven for 48 hours. The resulting solid melted at 210° C.

The compounds of the invention are excellent intermediates for the preparation of diesters of trimellitic acid where the 1,4- and 2,4-isomers are wanted with little or none of the 1,2-isomer present. The structure of these anhydrides permits esterification under conditions which essentially eliminate formation of the 1,2-diester.

Thus having described the invention, what is claimed is:

1. The class of compounds having the structural configuration

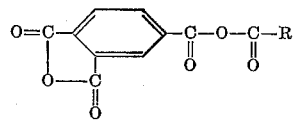

where "R" is alkyl containing from 1 to 10 carbon atoms.

2. A new compound: acetic(trimellitic anhydride) anhydride.

References Cited in the file of this patent

UNITED STATES PATENTS 2,911,416   Knobloch et al. _____ Nov. 3, 1959